US012801675B2

(12) United States Patent
Hayasaka et al.

(10) Patent No.: US 12,801,675 B2
(45) Date of Patent: Nov. 17, 2026

(54) CONTENT PROVISION DEVICE, CONTENT PROVISION METHOD, AND RECORDING MEDIUM

(71) Applicant: Rakuten Group, Inc., Tokyo (JP)

(72) Inventors: Yusuke Hayasaka, Tokyo (JP); Chisa Yamamoto, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/961,799

(22) Filed: Nov. 27, 2024

(65) Prior Publication Data

US 2025/0181659 A1 Jun. 5, 2025

(30) Foreign Application Priority Data

Nov. 30, 2023 (JP) ................................ 2023-203092

(51) Int. Cl.

| | |
|---|---|
| ***G06F 17/30*** | (2006.01) |
| ***G06F 3/04842*** | (2022.01) |
| ***G06F 3/0485*** | (2022.01) |
| ***G06F 16/9535*** | (2019.01) |

(52) U.S. Cl.

CPC ...... *G06F 16/9535* (2019.01); *G06F 3/04842* (2013.01); *G06F 3/0485* (2013.01)

(58) Field of Classification Search

CPC ........ G06F 16/13; G06F 16/24; G06F 16/156; G06F 3/1297; G06N 3/00; G06N 5/00; G05B 13/00; H03M 7/30; H04N 9/8042; G06T 9/00

See application file for complete search history.

(56) References Cited

U.S. PATENT DOCUMENTS

| | | | | |
|---|---|---|---|---|
| 9,654,598 | B1 * | 5/2017 | Crawford | H04W 4/023 |
| 10,838,585 | B1 * | 11/2020 | Douglas | G06F 3/0482 |
| 11,475,058 | B1 * | 10/2022 | Gupta | G06F 40/134 |
| 2017/0060372 | A1 * | 3/2017 | Salituri | G06F 3/0485 |
| 2020/0167827 | A1 * | 5/2020 | Chaula | G06Q 30/0641 |
| 2020/0359074 | A1 * | 11/2020 | Harijan | H04N 21/266 |
| 2021/0004583 | A1 * | 1/2021 | Evans | G06V 30/416 |
| 2021/0081222 | A1 * | 3/2021 | Cummins | G06F 3/0488 |
| 2021/0119853 | A1 * | 4/2021 | Kwak | H04L 67/51 |

(Continued)

FOREIGN PATENT DOCUMENTS

| | | |
|---|---|---|
| JP | 2012-8868 A | 1/2012 |
| JP | 4919879 B2 | 4/2012 |

(Continued)

OTHER PUBLICATIONS

English Translation of Office Action issued Jan. 7, 2025 in Japanese Application No. 2023-203092.

*Primary Examiner* — Hung D Le

(74) *Attorney, Agent, or Firm* — Sughrue Mion, PLLC

(57) ABSTRACT

A content provision device includes a headline display that displays a list of headlines of contents on a screen, an acquirer that acquires an instruction to select any of the headlines displayed on the screen, a provider that provides a content of the selected headline when the instruction is acquired, and a specifier that specifies a headline of another content based on a headline of a most recently selected content in the list, wherein the headline display displays the headline of the another content specified by the specifier within the screen by automatic scrolling after a provision state of the provided content is finished.

6 Claims, 11 Drawing Sheets

(56) References Cited

U.S. PATENT DOCUMENTS

| | | | | |
|---|---|---|---|---|
| 2022/0158961 | A1* | 5/2022 | Stamatiou | H04L 51/222 |
| 2023/0122834 | A1* | 4/2023 | Gupta | H04N 21/4532 725/34 |
| 2024/0364805 | A1* | 10/2024 | Knight | G06Q 30/06 |
| 2025/0005631 | A1* | 1/2025 | Onghai | G06F 16/951 |

FOREIGN PATENT DOCUMENTS

| | | | |
|---|---|---|---|
| JP | 5585239 | B2 | 9/2014 |
| JP | 2015-29279 | A | 2/2015 |

* cited by examiner

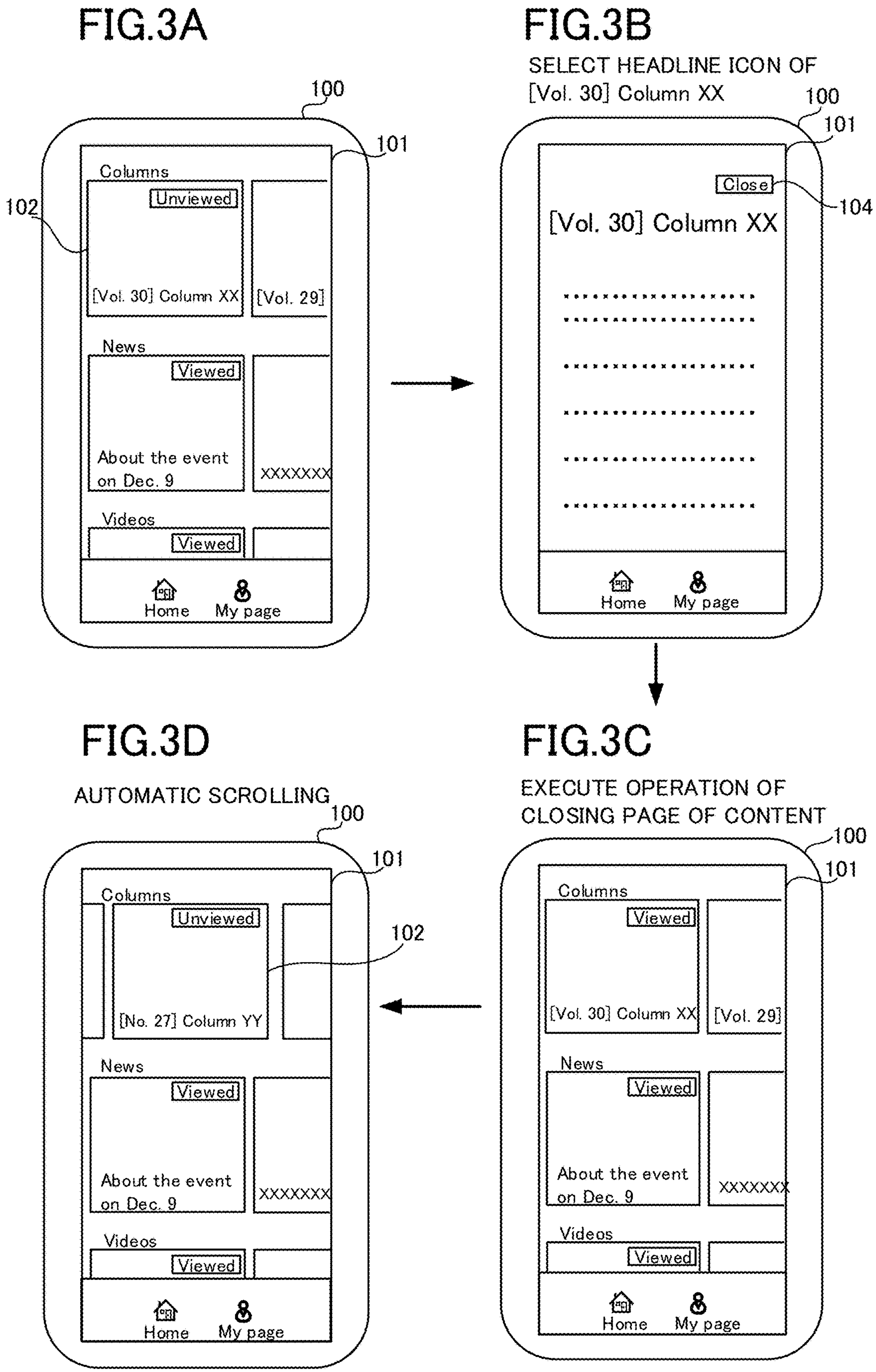
FIG.3A
100
101
102
Columns
Unviewed
[Vol. 30] Column XX
[Vol. 29]
News
Viewed
About the event on Dec. 9
XXXXXXX
Videos
Viewed
Home
My page
FIG.3B
SELECT HEADLINE ICON OF [Vol. 30] Column XX
100
101
Close
104
[Vol. 30] Column XX
Home
My page
FIG.3C
EXECUTE OPERATION OF CLOSING PAGE OF CONTENT
100
101
Columns
Viewed
[Vol. 30] Column XX
[Vol. 29]
News
Viewed
About the event on Dec. 9
XXXXXXX
Videos
Viewed
Home
My page
FIG.3D
AUTOMATIC SCROLLING
100
101
102
Columns
Unviewed
[No. 27] Column YY
News
Viewed
About the event on Dec. 9
XXXXXXX
Videos
Viewed
Home
My page

FIG.4

CONTENT MANAGEMENT TABLE

| CONTENT ID | CATEGORY | HEADLINE ICON ID | URL | DATE OF REGISTRATION |
|---|---|---|---|---|
| A001 | COLUMN | ZA001 | https://・・・.html | 2023/9/1 |
| B001 | NEWS | ZB001 | https://・・・.html | 2023/9/5 |
| C001 | VIDEO | ZC001 | ZZZ.com/・・・ | 2023/9/6 |
| A002 | COLUMN | ZA002 | https://・・・.html | 2023/9/8 |
| ⋮ | | | | |

FIG.5

PRESENTATION LIST

| CATEGORY | No. | CONTENT ID | HEADLINE ICON ID |
|---|---|---|---|
| COLUMN | 1 | A030 | ZA030 |
| COLUMN | 2 | A029 | ZA029 |
| COLUMN | 3 | A028 | ZA028 |
| COLUMN | 4 | A027 | ZA027 |
| ⋮ | | | |
| NEWS | 1 | B059 | ZB059 |
| NEWS | 2 | B058 | ZB058 |
| ⋮ | | | |
| VIDEO | 1 | C025 | ZC025 |
| VIDEO | 2 | C024 | ZC024 |
| ⋮ | | | |

FIG.7

VIEWING HISTORY DATABASE

| CONTENT ID | LAST DISPLAY DATE AND TIME |
|---|---|
| A029 | 2023/12/20 13:56 |
| A028 | 2023/12/20 13:45 |
| A025 | 2023/12/10 14:30 |
| · · · | |

FIG.10

USER VIEWING HISTORY DATABASE

| USER ID | CONTENT ID | LAST PROVISION DATE AND TIME |
|---|---|---|
| u0001 | A029 | 2023/12/20 13:56 |
| u0001 | A028 | 2023/12/20 13:45 |
| u0020 | B003 | 2023/12/20 12:40 |
| ⋮ | | |
| u0001 | A025 | 2023/12/10 14:30 |
| ⋮ | | |

CONTENT PROVISION DEVICE, CONTENT PROVISION METHOD, AND RECORDING MEDIUM

CROSS-REFERENCE TO RELATED APPLICATIONS

This application claims the benefit of Japanese Patent Application No. 2023-203092, filed on Nov. 30, 2023, the entire disclosure of which is incorporated by reference herein.

FIELD OF THE INVENTION

The present disclosure relates to a content provision device, a content provision method, and a recording medium.

BACKGROUND OF THE INVENTION

A technique for providing a content via a network is known (for example, Unexamined Japanese Patent Application Publication No. 2015-029279).

SUMMARY OF THE INVENTION

In such a technique, a list of contents is displayed on a screen, and a selected content is provided. Then, when viewing the content is finished, the most recently presented list is displayed again to wait for selection of a next content. However, when there is no content of interest to a user in the displayed list, the user has to search for another content by himself/herself, which involves time and effort. Therefore, there has been room for improvement in terms of presenting a content more effectively.

The present disclosure has been made in view of the above circumstance, and an objective of the present disclosure is to provide a content provision device, a content provision method, and a recording medium that can present a content more effectively.

In order to solve the above problem, a content provision device according to the present disclosure includes one or more processors, wherein the processor displays a list of headlines of contents on a screen, acquires an instruction to select any of the headlines displayed on the screen, provides a content of the selected headline when the instruction is acquired, specifies a headline of another content based on a headline of a most recently selected content in the list, and displays the specified headline of the another content within the screen by automatic scrolling after a provision state of the provided content is finished.

According to the present disclosure, a content provision device, a content provision method, and a recording medium that can present a content more effectively can be provided.

BRIEF DESCRIPTION OF DRAWINGS

A more complete understanding of this application can be obtained when the following detailed description is considered in conjunction with the following drawings, in which:

FIG. 3A is a diagram illustrating an example of a screen displayed in the content provision device;

FIG. 3B is a diagram illustrating an example of a screen displayed in the content provision device;

FIG. 3C is a diagram illustrating an example of a screen displayed in the content provision device;

FIG. 3D is a diagram illustrating an example of a screen displayed in the content provision device;

FIG. 4 is a diagram illustrating one example of a content management table stored by a server;

FIG. 5 is a diagram illustrating one example of a presentation list generated by the server;

FIG. 7 is a diagram illustrating one example of a viewing history database illustrated in FIG. 6;

FIG. 10 is a diagram illustrating one example of a user viewing history database stored by the server.

DETAILED DESCRIPTION OF THE INVENTION

Figure 1:
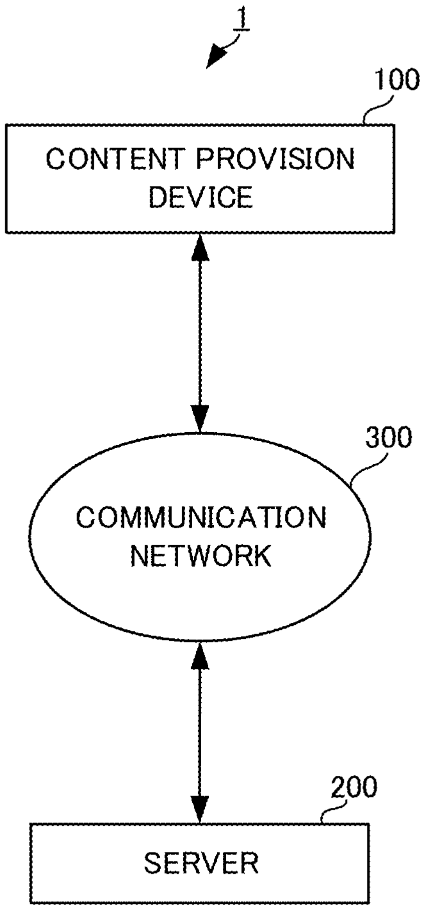
FIG. 1 is a diagram illustrating an overall configuration of a content provision system according to an embodiment.

Hereinafter, an embodiment of the present disclosure is described in detail with reference to drawings. Note that, the same or equivalent parts in the drawings are denoted by the same reference signs. The present embodiment is for the illustrative purpose and does not limit the scope of the disclosure of the present application. Therefore, a person skilled in the art can adopt embodiments in which each or all of the elements thereof are substituted by equivalents thereto, but the embodiments are also included in the scope of the present disclosure.

A content provision device 100 according to an embodiment of the present disclosure is described by using an example applied to a content provision system 1 illustrated in FIG. 1. The content provision system 1 is a system that acquires, from a server 200, information of contents to be presented to a user, displays headlines of the contents on a display screen of the content provision device 100, and provides the user with a content corresponding to a headline selected by the user.

The content provision system 1 includes the content provision device 100 and the server 200. The content provision device 100 and the server 200 are connected via a communication network 300 such as the Internet. Note that, while one content provision device 100 is illustrated in FIG. 1, the number of the applicable content provision devices 100 in the content provision system 1 is not limited thereto, but a plurality of content provision devices 100 may be applied. Herein, a content means a digital content. Specifically, a content includes an article content such as a column or news, a video content, a music content, and the like.

The content provision device 100 is a computer that operates based on an operation performed by a user who uses (views) contents, and includes, for example, an information terminal such as a smartphone, a tablet, or a personal computer (PC). On the content provision device 100, an application for viewing contents managed by the server 200 is installed. When a user performs an operation of indicating application launch, the content provision device 100 launches the application, acquires a content from the server 200, and displays and outputs the content. Thereby, the user can view the content.

Figure 2:
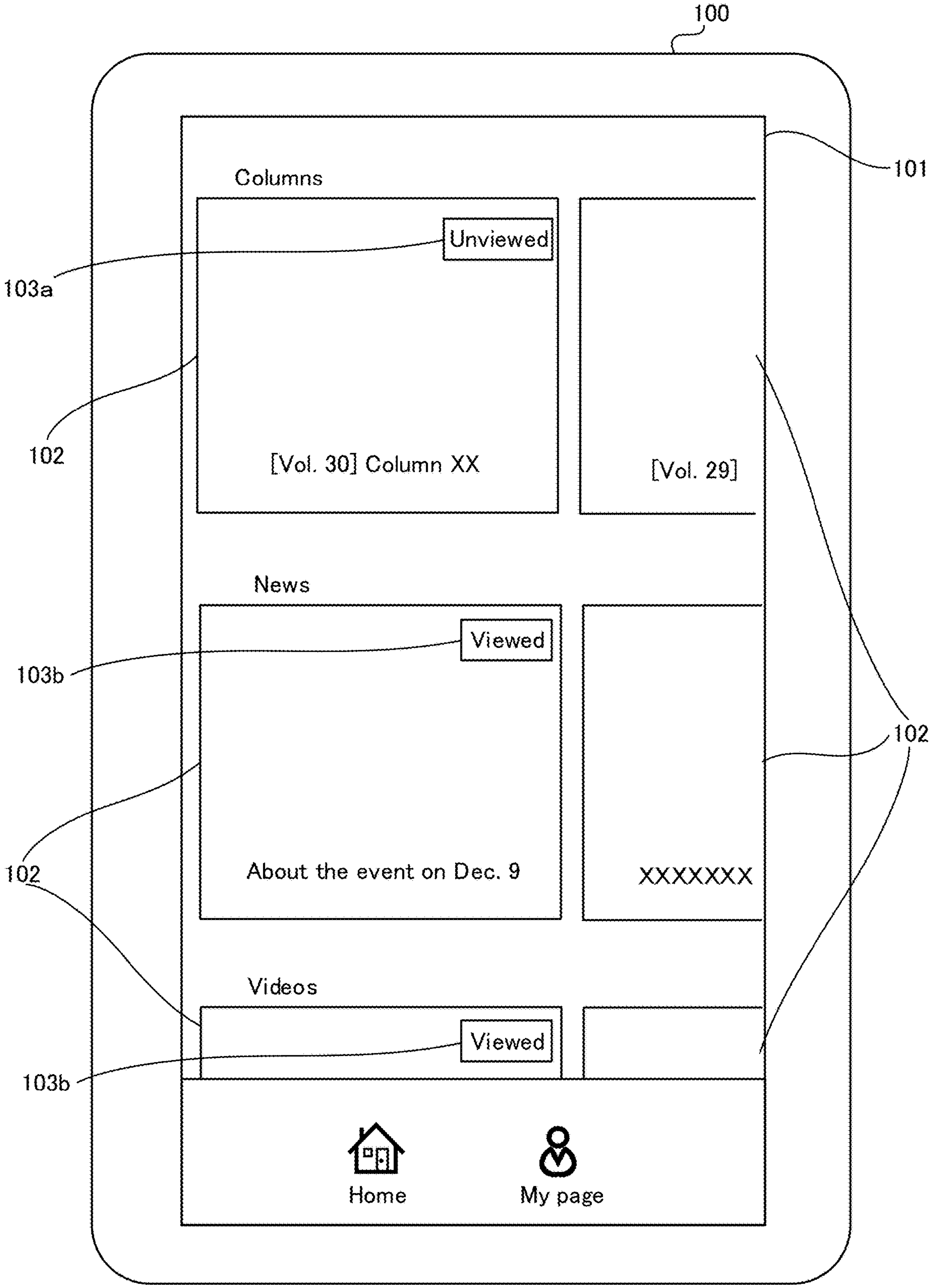
FIG. 2 is a diagram illustrating one example of a headline list displayed on a screen of a content provision device.

When launching the application, the content provision device 100 acquires, from the server 200, a presentation list indicating information of contents to be presented to a user, and displays a headline list of the contents included in the presentation list on a display screen. Herein, one example of the headline list displayed on a display screen 101 is illustrated in FIG. 2. As illustrated, the headline list is provided with sections for each category of contents such as columns, news, and videos. In each section, headline icons 102 that are icons expressing a headline of each content are arranged horizontally. The headline icon 102 includes, for example, a thumbnail image, text information, and the like representing a content corresponding to the headline icon 102. Further, at a predetermined position of the headline icon 102, either an icon 103*a* indicating that a content corresponding to the headline icon 102 has been unviewed or an icon 103*b* indicating that a content corresponding to the headline icon 102 has been viewed is arranged.

The sections displayed on the display screen 101 are displayed in a vertically scrollable manner. For example, when the illustrated headline list is scrolled downward, the headline icons 102 of the "Video" content and another section arranged below the "Video" content are displayed on the display screen 101.

Further, in each section, the headline icons 102 of the contents are arranged in a raw in a horizontally scrollable manner. Specifically, the headline icons 102 are arranged rightward in descending order of display ranking set in the presentation list. For example, when the "Column" section area is scrolled rightward, another headline icon 102 arranged on the right of the headline icon 102 of "[Vol. 30] Column XX" is displayed within the display screen 101 in a visually recognizable manner.

When any of the headline icons 102 displayed on the display screen 101 is selected by a selection operation of the user, the content provision device 100 hides the headline list and displays a content corresponding to the selected headline icon 102 on the display screen 101. Herein, one example of a transition state of the display screen 101 is illustrated in FIG. 3. When the headline icon 102 of "Vol. 30 Column XX" in the "Column" section is selected in the headline list illustrated in FIG. 3A, a content corresponding to the selected headline icon 102 is displayed on the display screen 101, as illustrated in FIG. 3B.

Further, when the user finishes viewing the content and performs an operation of closing the content, the content provision device 100 displays the most recently displayed headline list on the display screen 101 again. For example, when a close button 104 arranged on the display screen 101 illustrated in FIG. 3B is pressed, the content provision device 100 closes a page of the content and displays the headline list illustrated in FIG. 3C on the display screen 101 again. Note that, in the redisplayed headline list, the icon 103*a* indicating that the content has been unviewed is replaced by the icon 103*b* indicating that the content has been viewed, in the headline icon 102 of the most recently viewed content "Vol. 30 Column XX".

When the headline list is redisplayed, the content provision device 100 refers to a viewing history of contents in the same category as the most recently viewed content, and specifies another content to be presented to the user. The content provision device 100 executes automatic scrolling rightward in a target section of the headline list until the headline icon 102 of the specified content is displayed.

Specifically, as illustrated in FIG. 3D, when "[Vol. 27] Column YY" is specified as a content to be presented to the user, the content provision device 100 executes automatic scrolling rightward in the "Column" section of the headline list illustrated in FIG. 3C until the headline icon 102 of specified "[Vol. 27] Column YY" is displayed visibly within the display screen 101.

Returning to FIG. 1, the server 200 includes one or a plurality of server computers. The server 200 is, for example, a device that is operated by a content provider or the like, and is used by the content provider to create and register contents or the like.

Specifically, the server 200 stores a content management table for managing registered contents. Herein, one example of the content management table stored in the server 200 is illustrated in FIG. 4. As illustrated, the content management table includes information such as "Content ID" that is information uniquely identifying a content, "Category" indicating a category of a content, "Headline icon ID" that is information uniquely identifying the headline icon 102 of a content, "URL" indicating a uniform resource locator (URL) of a content, and "Registration date" indicating a date when a content is registered.

When the content provision device 100 launches an application for viewing contents according to an operation performed by a user, the server 200 generates, based on the content management table, a presentation list of contents to be presented to the user, and transmits the generated presentation list to the content provision device 100. For example, the server 200 generates a presentation list by extracting, for each category of contents, a set number of contents with a new date of registration, and ranking the contents in reverse chronological order of date of registration. The server 200 sets the ranking as display ranking. Herein, one example of the presentation list is illustrated in FIG. 5. As illustrated, the presentation list includes information such as "Category" that is information specifying a category of each content, "No." that is information defining display ranking of each content, "Content ID" that is information uniquely identifying each content, and "Headline icon ID" for uniquely identifying the headline icon 102 of each content.

Further, the server 200 specifies a URL of a content corresponding to the headline icon 102 selected by the user from among the headline icons 102 included in the headline list displayed on the display screen 101, and transmits the specified URL to the content provision device 100.

The communication network 300 may include various types of networks. Examples thereof include, for example, a local area network (LAN), a wide area network (WAN) such as the Internet, a telecommunication network such as a public switched telephone network (PSTN), a wireless network, a public switched network, a satellite network, a cellular network, a public land mobile network (PLMN), a metropolitan area network (MAN), a private network, an ad hoc network, an intranet, a fiber optic-based network, and the like, and a combination thereof or other types of networks.

Functional Configuration of Content Provision Device

Figure 6:
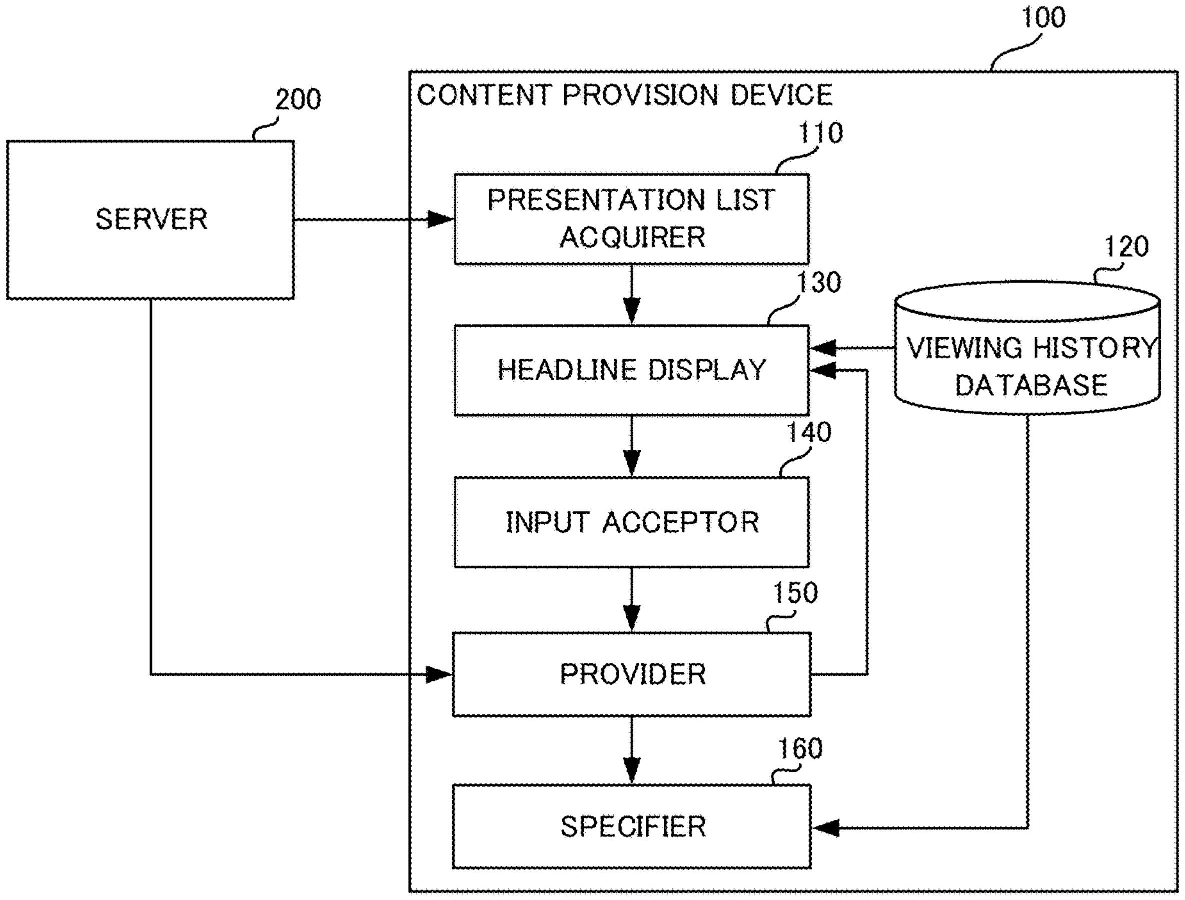
FIG. 6 is an explanatory diagram illustrating a functional configuration of the content provision device.

Next, a functional configuration of the content provision device 100 is described by using FIG. 6. The content provision device 100 includes a presentation list acquirer 110, a viewing history database 120, a headline display 130, an input acceptor 140, a provider 150, and a specifier 160.

The presentation list acquirer 110 acquires a presentation list generated by the server 200 and illustrated in FIG. 5. The presentation list acquirer 110 transmits the acquired presentation list to the headline display 130.

The viewing history database 120 is a database that stores a viewing history of contents viewed by a user who uses the content provision device 100. Herein, one example of the viewing history database 120 is illustrated in FIG. 7. As illustrated, the viewing history database 120 includes information such as "Content ID" for uniquely identifying a content and "Last display date and time" indicating the most recent date and time when the content is displayed.

Returning to FIG. 6, the headline display 130 displays, based on the presentation list acquired by the presentation list acquirer 110 and the viewing history database 120, the headline list illustrated in FIG. 2 on the display screen 101. Specifically, the headline display 130 arranges, based on "Category" included in the presentation list, sections for each category in a vertically scrollable manner, and displays the headline icons 102 of contents in each section in a horizontally scrollable manner, in display order set by "No." included in the presentation list. When not all of the sections included in the presentation list can be batch-displayed on the display screen 101, the headline display 130 displays all of the sections on the display screen 101 by scrolling the display screen 101 vertically. Further, when not all of the headline icons 102 in each section can be batch-displayed on the display screen 101, the headline display 130 displays all of the headline icons 102 on the display screen 101 by scrolling the display screen 101 horizontally.

Further, the headline display 130 refers to the viewing history database 120, and displays, on the display screen 101, whether each content corresponding to the headline icon 102 has been viewed or has been unviewed. Specifically, the headline display 130 determines whether each content has been viewed by determining whether the viewing history database 120 includes a content ID of a content corresponding to the headline icon 102. As illustrated in FIG. 2, the headline display 130 displays, according to a result of determination, the icon **103*a* indicating that the content has been unviewed or the icon 103*b* indicating that the content has been viewed at a predetermined position of the headline icon 102 of each content. Note that, the headline display 130 may display only any of the icon 103*a* indicating that the content has been unviewed and the icon 103*b*** indicating that the content has been viewed.

Returning to FIG. 6, the input acceptor 140 accepts an instruction input to select any of the headline icons 102 displayed on the display screen 101. When the headline icon 102 is selected, the input acceptor 140 refers to the presentation list illustrated in FIG. 5, and specifies a content ID associated with a headline icon ID of the selected headline icon 102. The input acceptor 140 requests the server 200 to transmit a URL of a content of the specified content ID. Note that, the input acceptor 140 is one example of an acquirer.

The provider 150 provides a content corresponding to the headline icon 102 for which an instruction input has been accepted by the input acceptor 140. Specifically, when a URL of a content is acquired from the server 200, the provider 150 accesses the acquired URL to acquire content data, and displays the content on the display screen 101. The provider 150 displays the content on the display screen 101 by generating a new page for displaying the content. Accordingly, the headline list that has been displayed on the display screen 101 is hidden while the content is displayed.

When detecting that viewing the content provided by the provider 150 is finished, the specifier 160 specifies another content corresponding to the headline icon 102 to be newly displayed within the display screen 101, based on a determined rule. For example, the specifier 160 specifies a content to be presented to a user, based on such a rule that a content unprovided to (unviewed by) the user and ranked highest in display ranking in the presentation list is presented to the user among contents being in the same category as the most recently viewed content and ranked lower than display ranking of the most recently viewed content. The specifier 160 notifies a headline icon ID of the specified content to the headline display 130. The headline display 130 executes automatic scrolling until the headline icon 102 corresponding to the notified headline icon ID is displayed within the display screen 101. In this way, the headline display 130 displays a headline of the content specified by the specifier 160 within the display screen 101 by automatic scrolling after viewing (a provision state) of the provided content is finished.

Hardware Configuration of Information Processing Device

Figure 8:
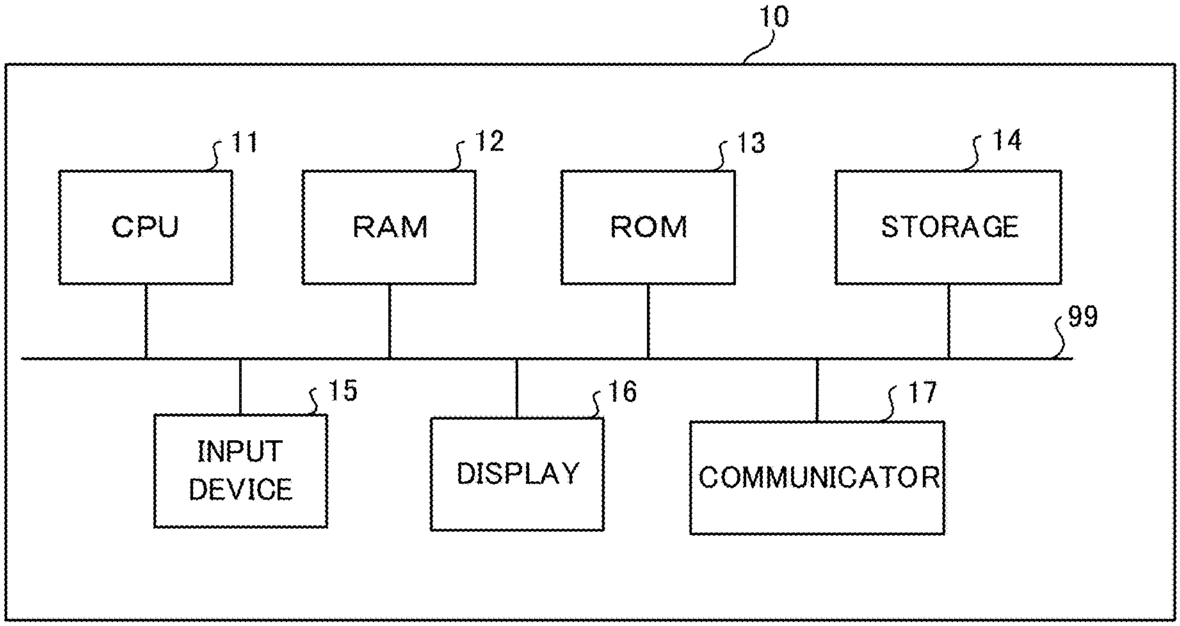
FIG. 8 is an explanatory diagram illustrating a hardware configuration of an information processing device.

FIG. 8 is a block diagram illustrating a hardware configuration of an information processing device 10 that achieves the content provision device 100 and the server 200. The information processing device 10 includes a central processing unit (CPU) 11 that executes processing according to a program, a random access memory (RAM) 12 that is a volatile memory, a read only memory (ROM) 13 that is a non-volatile memory, a storage 14 that stores data, an input device 15 that accepts an input of information, a display 16 that displays information visually, and a communicator 17 that transmits and receives information, which are connected via an internal bus 99.

The CPU 11 controls an operation of the entire information processing device 10, is connected to each component, and exchanges a control signal or data. The CPU 11 executes various kinds of processing by reading a program stored in the storage 14 into the RAM 12 and executing the program. The CPU 11 executes, as a major function provided by a program, each piece of processing performed by the headline display 130, the input acceptor 140, the provider 150, and the specifier 160. Note that, the CPU 11 may execute each piece of processing performed by the presentation list acquirer 110 and the input acceptor 140.

The RAM 12 is for temporarily recording data or a program, and holds a program or data read from the storage 14, other data necessary for communication, and the like. The RAM 12 is used as a work area for the CPU 11.

The ROM 13 stores a control program executed by the CPU 11 for a basic operation of the information processing device 10, a basic input/output system (BIOS), and the like.

The storage 14 includes a hard disk drive, a flash memory, and the like, stores a program executed by the CPU 11, and stores various kinds of data used in execution of the program. The storage 14 functions as the viewing history database 120.

The input device 15 is a user interface that includes a touch panel, a keyboard, a mouse, a communication device, and the like. The input device 15 accepts an operation input from a user of the information processing device 10, and outputs a signal corresponding to the accepted operation input to the CPU 11. The input device 15 functions as the input acceptor 140.

The display 16 is a display device that displays information visually, such as a liquid-crystal display, an organic electro-luminescence (EL) display, or the like.

The communicator 17 is a network termination device or a wireless communication device that connects to a network, and a serial interface or a local area network (LAN) interface that connects thereto. The information processing device 10 intercommunicates with another information processing device or the like via the communicator 17. The communicator 17 functions as the presentation list acquirer 110 and the provider 150.

Content Provision Processing

Next, an operation of the content provision device 100 and the server 200 is described with reference to FIG. 9. When a user operates the content provision device 100 to log in an application for viewing contents installed in advance in the content provision device 100, content provision processing is started.

When detecting that the user has logged in the application, the server 200 transmits a presentation list of contents to be presented to the user to the content provision device 100 (Step S151). Specifically, the server 200 extracts contents to be presented to the user based on the content management table illustrated in FIG. 4, and generates the presentation list illustrated in FIG. 5. The server 200 generates a presentation list by extracting contents for each category based on, for example, such a rule that a set number of contents with a new date of registration is extracted, and ranking the contents in reverse chronological order of date of registration. Note that, the rule for determining contents to be presented to the user is not limited thereto, but may be any rule. For example, contents that are expected to be of high interest to the user from a user's past viewing history may be extracted for each category, or contents with a large total number of views by all users may be extracted.

Next, the presentation list acquirer 110 of the content provision device 100 acquires the presentation list transmitted from the server 200 (Step S101). The presentation list acquirer 110 transmits the acquired presentation list to the headline display 130.

Next, the headline display 130 displays, on the display screen 101, a headline list displaying the headline icons 102 of the contents included in the presentation list, based on the presentation list acquired by the presentation list acquirer 110 (Step S102). Specifically, as illustrated in FIG. 3A, the headline display 130 arranges, based on "Category" included in the presentation list illustrated in FIG. 5, sections for each category in a vertically scrollable manner, and displays the headline icons 102 of the contents in each section in a manner scrollable from left to right, in descending order of display ranking set by "No." included in the presentation list. For example, in the headline list first displayed on the display screen 101, the headline icons 102 of contents ranked highest in display ranking set in the presentation list are displayed within the display screen 101 in a visually recognizable manner, and the headline icons 102 of contents ranked lower in display ranking are displayed within the display screen 101 when the headline list is scrolled rightward by the user.

Further, the headline display 130 refers to the viewing history database 120, and displays, on the display screen 101, whether each content included in the presentation list has been viewed or has been unviewed together with the headline icon 102. Specifically, the headline display 130 determines whether each content has been viewed by determining whether the viewing history database 120 includes a content ID of each content. The headline display 130 displays, according to a result of determination, the icon 103*a* indicating that the content has been unviewed or the icon 103*b* indicating that the content has been viewed at a predetermined position of the headline icon 102 of each content.

Next, the input acceptor 140 waits for selection of the headline icon 102 (Step S103). Specifically, the input acceptor 140 accepts an instruction input to select any of the headline icons 102 from the headline list displayed on the display screen 101. The user selects any of the headline icons 102 from the first displayed headline list by operating the input device 15, or selects any of the headline icons 102 by scrolling the headline list vertically or horizontally to display another section or another headline icon 102 on the display screen 101.

When detecting that the headline icon 102 has been selected (Step S104; Yes), the input acceptor 140 refers to the presentation list acquired in Step S101, and specifies a content ID associated with a headline icon ID of the selected headline icon 102. The input acceptor 140 transmits the specified content ID to the server 200 (Step S105), and requests the server 200 to transmit a URL of a content corresponding to the specified content ID. Note that, the input acceptor 140 may transmit a user ID that is information uniquely identifying the user.

Meanwhile, when determining that the headline icon 102 has not been selected (Step S104; No), the processing returns to Step S103 and the input acceptor 140 waits for selection of the headline icon 102.

Next, when receiving the content ID transmitted in Step S105, the server 200 transmits a URL of a content corresponding to the received content ID to the content provision device 100 (Step S152). Specifically, the server 200 refers to the content management table illustrated in FIG. 4, specifies a URL of a content corresponding to the received content ID, and transmits the specified URL to the content provision device 100.

Next, the provider 150 displays the content on the display screen 101 (Step S106). Specifically, the provider 150 accesses the URL received from the server 200 to acquire content data, and displays the content on the display screen 101 as illustrated in FIG. 3B by generating a new page for displaying the acquired content data. Further, the provider 150 stores, in the storage 14, a display state of the sections and the headline icons 102 in the most recently displayed headline list. The display state includes information such as a position of each section and a position or a size of the headline icon 102 on the display screen 101.

Next, the provider 150 updates the viewing history database 120 illustrated in FIG. 7 (Step S107). Specifically, the provider 150 updates the viewing history database 120 by newly storing, in the viewing history database 120, the content ID and a display time of the content displayed in Step S106.

Next, the provider 150 determines whether viewing the content displayed on the display screen 101 in Step S106 has been finished (Step S108). Specifically, when detecting that the page of the content has been closed by an operation input such as pressing of the close button 104 arranged on the display screen 101 illustrated in FIG. 3B, the provider 150 determines that viewing the content has been finished (Step S108; Yes). Meanwhile, when not detecting that the page of the content has been closed, the provider 150 determines that viewing the content has not been finished (Step S108; No), and waits for an operation input of closing the page of the content.

In Step S109, the headline display 130 displays the headline list on the display screen 101 again (Step S109). Specifically, the headline display 130 displays the headline list illustrated in FIG. 3C on the display screen 101 by reading out the display state stored in the storage 14 in Step S106 and arranging the sections and the headline icons 102 at the same positions as in the headline list displayed on the display screen 101 immediately before the content is displayed. Note that, in the headline list, the unviewed icon 103*a* is replaced by the viewed icon 103*b*, in the headline icon 102 of the most recently viewed content, for example, "[Vol. 30] Column XX".

Next, the specifier 160 specifies another content corresponding to the headline icon 102 to be newly displayed within the display screen 101 (Step S110). Specifically, the specifier 160 specifies another content, based on such a rule that a content unprovided to the user and ranked highest in display ranking in the presentation list is presented to the user among contents being in the same category as the most recently viewed content and ranked lower than display ranking of the most recently viewed content. For example, when a content with a content ID "A030" in the presentation list illustrated in FIG. 5 is viewed in Step S106, the specifier 160 refers to the viewing history database 120 illustrated in FIG. 7, and specifies a content ID "A027" of a content unviewed and ranked highest among contents ranked lower than display ranking of the content ID "A030" set in the presentation list. The specifier 160 notifies, to the headline display 130, a headline icon ID "ZA027" corresponding to the specified content ID "A027".

Note that, when there is no unviewed content in the presentation list, the specifier 160 may specify, as another content, a content ranked next to display ranking of the most recently displayed content in the presentation list. Specifically, the specifier 160 specifies, as another content, a content ID "A029" ranked next to display ranking of the content ID "A030" of the most recently displayed content, and notifies the content ID "A029" to the headline display 130.

Next, the headline display 130 executes automatic scrolling until the headline icon 102 corresponding to the headline icon ID notified in Step S110 is displayed within the display screen 101 (Step S111). Specifically, when the content corresponding to the headline icon ID "ZA027" notified in Step S110 is "[Vol. 27] Column YY", the headline display 130 executes automatic scrolling rightward until the whole headline icon 102 of "[Vol. 27] Column YY" is arranged at a visually recognizable predetermined position within the display screen 101, as illustrated in FIG. 3D.

Next, returning to Step S103, the input acceptor 140 waits for selection of the headline icon 102 in the headline list displayed in Step S111, and executes the processing in Step S104 and thereafter described above.

As described above, when viewing a certain content is finished and a headline list is displayed again, the content provision device 100 displays the headline icon 102 of another content within the display screen 101. The content corresponding to the displayed headline icon 102 is, for example, a content unviewed by a user, which can save time and effort for the user in searching for another content by scrolling or entering a search keyword by himself/herself. Accordingly, the user can view unviewed contents one after another without much time and effort, which can prevent the user from leaving the service.

Further, after a headline list is displayed again, the content provision device 100 displays the headline icon 102 of another content in a visually recognizable manner on the display screen 101 by automatic scrolling. A scrolling motion of the headline icon 102 can make the headline icon 102 stand out, which can make it easier for the user to recognize that the headline icon 102 of another content has been presented.

MODIFIED EXAMPLE

The server 200 may carry out a part of the functions of the content provision device 100. For example, in the above embodiment, when viewing a content is finished and a headline list is redisplayed, the content provision device 100 specifies an unviewed another content and displays the specified another content on the display screen 101 by automatic scrolling. However, the server 200 may execute processing thereof.

In this case, the server 200 may include a user viewing history database for recording a viewing history of a user, and may execute the function of the specifier 160. Herein, one example of the user viewing history database is illustrated in FIG. 10. As illustrated, the user viewing history database includes information such as "User ID" that is information uniquely identifying a user, "Content ID" that is information uniquely identifying a content, and "Last provision date and time" that is the most recent date and time when the content is provided to the user. "Last provision date and time" stores, for example, a date and time when the server 200 transmits a URL of the content to the content provision device 100.

Figure 11:
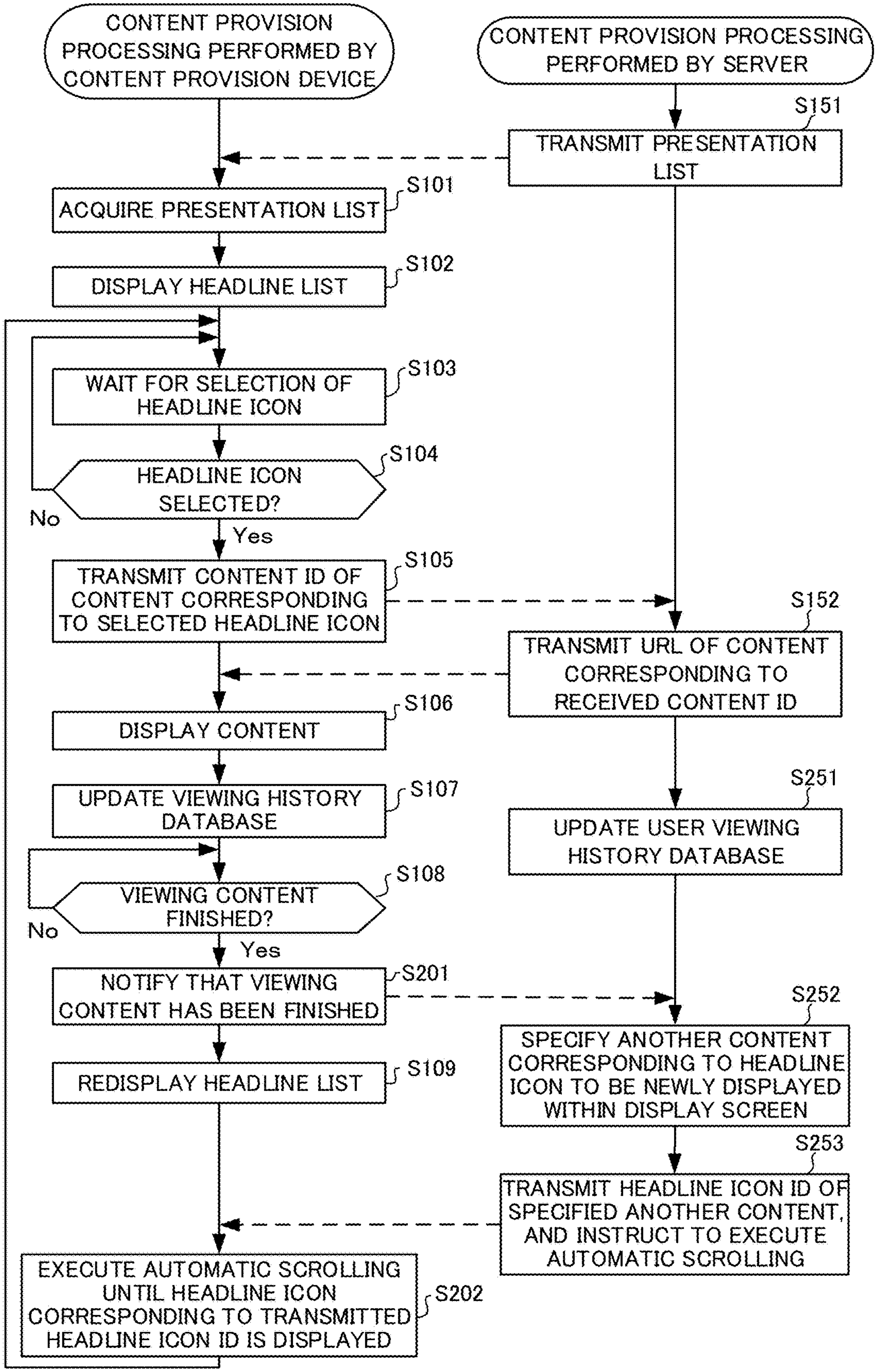
FIG. 11 is a flowchart of content provision processing according to a modified example.

A detail of processing in this case is described with reference to FIG. 11. Note that, since the processing includes steps in common with the flowchart illustrated in FIG. 9, differences are mainly described.

Figure 9:
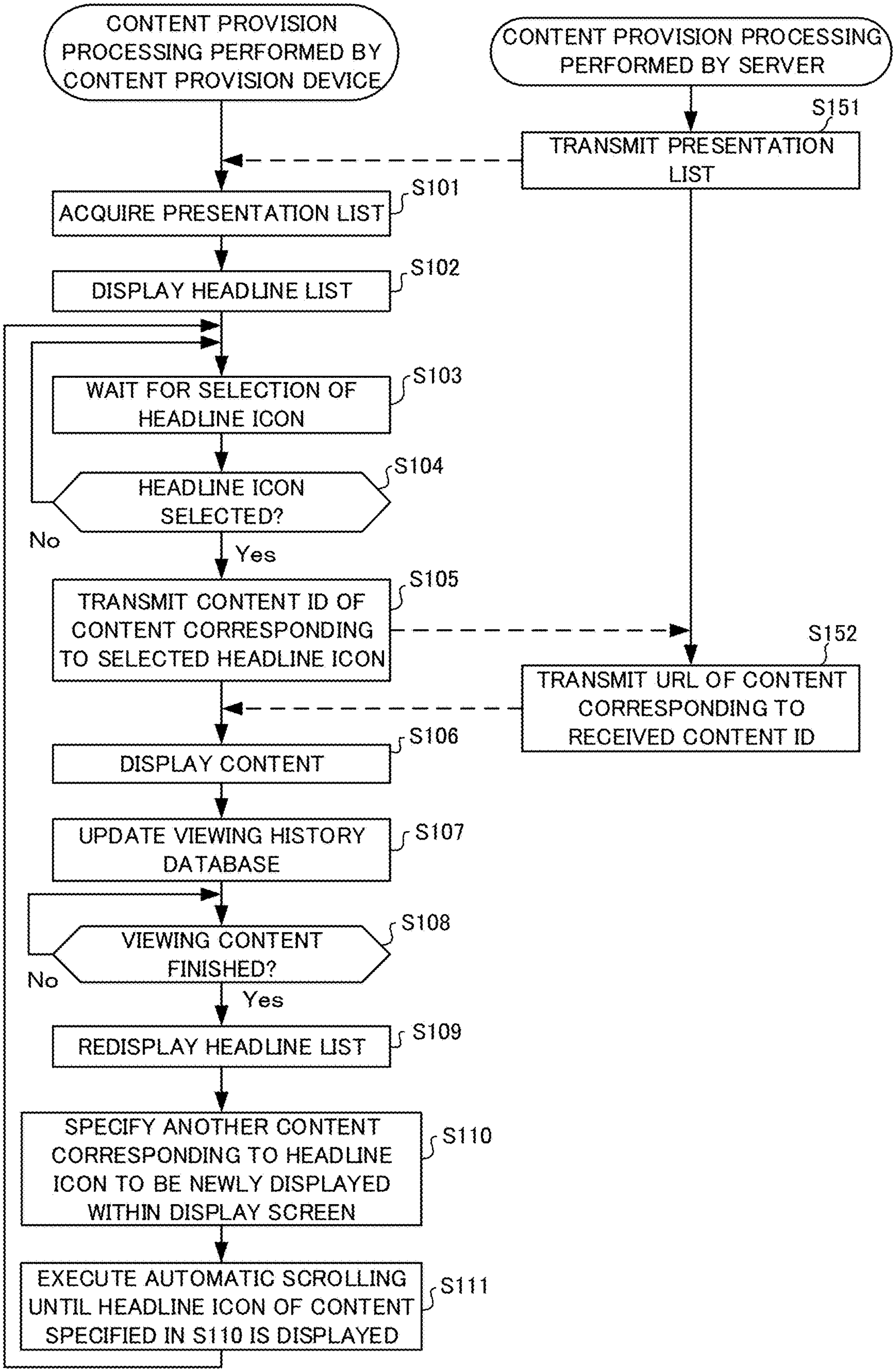
FIG. 9 is a flowchart of content provision processing performed by the content provision device and the server.

After processing similar to Step S151 and Steps S101 to S105 in FIG. 9 is executed, when a URL of a content is transmitted in Step S152, the server 200 stores, in the user viewing history database, that the content corresponding to the transmitted URL has been provided. Specifically, the server 200 updates the user viewing history database by adding, to the user viewing history database illustrated in FIG. 10, a user ID and a date and time when the URL is transmitted (Step S251).

Next, after processing similar to Steps S106 to S108 in FIG. 9 is executed, when determining that viewing the content has been finished (Step S108; Yes), the provider 150 of the content provision device 100 transmits, to the server 200, a notification that viewing the content has been finished (Step S201).

Next, the server 200 specifies another content corresponding to the headline icon 102 to be newly displayed within the display screen 101 (Step S252). Specifically, the server 200 specifies a content to be displayed within the display screen 101 by processing similar to Step S110 in FIG. 9, based on the presentation list illustrated in FIG. 5 generated in Step S151 and the user viewing history database illustrated in FIG. 10. For example, the server 200 specifies another content, based on such a rule that a content unprovided to the user and ranked highest in display ranking in the presentation list is presented to the user among contents being in the same category as the most recently viewed content and ranked lower than display ranking of the most recently viewed content.

Next, the server 200 transmits a headline icon ID of the content specified in Step S252 to the content provision device 100, and instructs to execute automatic scrolling until the headline icon 102 corresponding to the transmitted headline icon ID is displayed within the display screen 101 (Step S253).

Next, the content provision device 100 executes, by processing similar to Step S111 in FIG. 9, automatic scrolling until the headline icon 102 corresponding to the headline icon ID transmitted in Step S253 is displayed (Step S202).

As described above, processing load of the content provision device 100 can be reduced by the server 200 executing the function of the specifier 160.

Further, in the above embodiment, one headline icon 102 is displayed within the display screen 101 in a visually recognizable manner in the headline list illustrated in FIG. 2, but is not limited thereto. The headline icon 102 may have any size, and, for example, a plurality of headline icons 102 may be displayed in a visually recognizable manner in each category.

Further, in the above embodiment, when there is no unviewed content in the presentation list, the specifier 160 specifies, as another content, a content ranked next to display ranking of the most recently displayed content, but is not limited to the description. For example, the specifier 160 may specify, as another content, a content in another category including unviewed contents. For example, in the headline list illustrated in FIG. 3C, when "[Vol. 30] Column XX" in the "Column" section is viewed and other contents in the "Column" section have been all viewed, the specifier 160 may search for contents in order of the "News" section, the "Video" section, . . . , and may specify a content in another unviewed category as another content. Then, the specified content may be displayed, by automatic scrolling, within the display screen 101 in a section of the specified another category. Further, when there is no unviewed content in any category or the like, a message that there is no unviewed content may be displayed on the display screen 101.

In the above embodiment, a case in which reproduction of a selected content is finished, followed by automatic scrolling to reproduce another content has been described. Instead, the content provision device 100 may display a message to check whether to perform automatic scrolling before automatic scrolling, and may perform automatic scrolling when an instruction to allow automatic scrolling is given. Further, when there is a plurality of candidates for a destination of automatic scrolling, the content provision device 100 may display a message to prompt selection of the candidates.

In the above embodiment, while a case in which a content at a destination of automatic scrolling is specified based on date-of-registration order has been described as an example, a content at a destination of automatic scrolling may be specified by another method. As one example, the presentation list may include information relating to details of contents, and the content provision device 100 may specify, as a content at a destination of automatic scrolling, another content corresponding to a detail of a selected content. Specifically, when contents are articles relevant to baseball, the server 200 includes player's names listed in the articles as information relating to details of the contents. The content provision device 100 specifies a player's name listed in a selected content, and specifies, as a content at a destination of automatic scrolling, another content in which the player's name is listed. Thereby, the content provision device 100 can achieve display control of contents more effective for a user, by performing control in such a way that a content assumed to be liked by the user is preferentially displayed.

In the above embodiment, a case in which a content corresponding to the selected headline icon 102 is displayed with the headline list hidden and the headline list is redisplayed after viewing the content is finished has been described as an example, but is not limited thereto. For example, a content may be displayed in a superimposed manner on the headline list, and the headline list may be referred to when the content is closed.

In the above embodiment, the specifier 160 executes processing in Step S110 of specifying a content at a destination of automatic scrolling after the headline list is redisplayed in Step S109, but is not limited to the description. The specifier 160 may execute processing in Step S110 after selection of the headline icon 102 is detected in Step S104 and before determination that viewing the content is finished is made in Step S108.

Note that, the content provision device 100 and the server 200 according to the above embodiment can be achieved by using an ordinary computer, not by using a dedicated device. For example, the content provision device 100 or the server 200 executing the above-described processing may be configured by installing, on a computer, a program for executing any of the above in a computer from a recording medium in which the program is stored. Further, the content provision device 100 or the server 200 may be configured by a plurality of computers operating in cooperation.

Further, when the above-described function is achieved by sharing between an operating system (OS) and an application or by cooperation between an OS and an application or the like, only a part other than the OS may be stored in a medium.

Further, it is also possible to distribute programs superimposed on a carrier wave via a communication network. For example, the programs may be distributed through an application store (app store), or the programs may be posted on a bulletin board system (BBS) on a communication network and distributed via a network. Then, the above-described processing may be executed by starting the programs and executing the programs under control of the operating system in a manner similar to other application programs.

Further, information stored by the content provision device 100 and the server 200 may be centrally managed by a cloud server on a network, and the content provision device 100 may access the cloud server to read and write information as needed. In this case, the content provision device 100 may not include the viewing history database 120. Further, content provision processing performed by the content provision device 100 and the server 200 may be executed on a cloud by information stored in the cloud server.

Hereinafter, the various aspects of the present disclosure are described collectively as supplementary notes.

APPENDIX 1

A content provision device comprising:

one or more processors, wherein the processor displays a list of headlines of contents on a screen, acquires an instruction to select any of the headlines displayed on the screen, provides a content of the selected headline when the instruction is acquired, specifies a headline of another content based on a headline of a most recently selected content in the list, and displays the specified headline of the another content within the screen by automatic scrolling after a provision state of the provided content is finished.

APPENDIX 2

The content provision device according to appendix 1, wherein the processor specifies, as the headline of the another content, a headline of a content unprovided and ranked closest to display ranking of the most recently selected content in the list.

APPENDIX 3

The content provision device according to appendix 1, wherein the processor specifies, as the headline of the another content, a headline of a content ranked next to display ranking of the most recently selected content in the list.

APPENDIX 4

The content provision device according to any one of appendices 1 to 3, wherein the contents are classified into any of a plurality of categories, and the processor displays the list of the headlines of the contents in a scrollable manner for each of the categories.

APPENDIX 5

The content provision device according to any one of appendices 1 to 4, wherein the processor saves a display state of the list displayed on the screen, and after a provision state of the content is finished, restores the saved display state and redisplays the list on the screen, thereby executing the automatic scrolling.

APPENDIX 6

The content provision device according to any one of appendices 1 to 6, wherein the displayed headline includes an image or text information representing a content corresponding to the headline.

APPENDIX 7

A content provision method comprising, by a computer, displaying a list of headlines of contents on a screen, acquiring an instruction to select any of the headlines displayed on the screen, providing a content of the selected headline when the instruction is acquired, specifying a headline of another content based on a headline of a most recently selected content in the list, and displaying the specified headline of the another content within the screen by automatic scrolling after a provision state of the provided content is finished.

APPENDIX 8

A computer-readable recording medium that stores a program for causing a computer to execute processing of:

displaying a list of headlines of contents on a screen;

acquiring an instruction to select any of the headlines displayed on the screen;

providing a content of the selected headline when the instruction is acquired;

specifying a headline of another content based on a headline of a most recently selected content in the list; and displaying the specified headline of the another content within the screen by automatic scrolling after a provision state of the provided content is finished.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

According to the present disclosure, a content provision device, a content provision method, and a recording medium that can present a content more effectively can be provided.

The invention claimed is:

1. A content provision device comprising:

one or more storage devices configured to store computer program code; and at least one processor configured to access the one or more storage devices and operate according to the computer program code, the computer program code including:

display code configured to cause at least one of said at least one processor to display a list of headlines of contents on a screen, acquire code configured to cause at least one of said at least one processor to acquire an instruction to select any of the headlines displayed on the screen, provide code configured to cause at least one of said at least one processor to provide a content of the selected headline when the instruction is acquired, and specify code configured to cause at least one of said at least one processor to specify a headline of another content based on a headline of a most recently selected content in the list, wherein the display code is further configured to cause at least one of said at least one processor to display the specified headline of the another content within the screen by automatic scrolling after a provision state of the provided content is finished save code configured to cause at least one of said at least one processor to save a display state of the list displayed on the screen, and restore code configured to cause at least one of said at least one processor to restore, after a provision state of the content is finished, the saved display state and redisplays the list on the screen, thereby executing the automatic scrolling.

2. The content provision device according to claim 1, wherein the specify code is further configured to cause at least one of said at least one processor to specify, as the headline of the another content, a headline of a content unprovided and ranked closest to display ranking of the most recently selected content in the list.

3. The content provision device according to claim 1, wherein the specify code is further configured to cause at least one of said at least one processor to specify, as the headline of the another content, a headline of a content ranked next to display ranking of the most recently selected content in the list.

4. The content provision device according to claim 1, wherein the contents are classified into any of a plurality of categories, and the display code is further configured to cause at least one of said at least one processor to display the list of the headlines of the contents in a scrollable manner for each of the plurality of categories.

5. The content provision device according to claim 1, wherein the displayed specified headline includes an image or text information representing a content corresponding to the specified headline.

6. A content provision method performed by a computer, the method comprising:

displaying a list of headlines of contents on a screen;

acquiring an instruction to select any of the headlines displayed on the screen;

providing a content of the selected headline when the instruction is acquired;

specifying a headline of another content based on a headline of a most recently selected content in the list;

displaying the specified headline of the another content within the screen by automatic scrolling after a provision state of the provided content is finished;

saving a display state of the list displayed on the screen; and restoring, after a provision state of the content is finished, the saved display state and redisplays the list on the screen, thereby executing the automatic scrolling.

* * * * *